United States Patent
Tsuchiya et al.

(10) Patent No.: US 10,822,452 B2
(45) Date of Patent: Nov. 3, 2020

(54) LIQUID CRYSTAL POLYESTER RESIN COMPOSITION

(71) Applicant: UENO FINE CHEMICALS INDUSTRY, LTD., Osaka-shi, Osaka (JP)

(72) Inventors: Hitoshi Tsuchiya, Sanda (JP); Hiroto Uchida, Sanda (JP); Masahiro Fukazawa, Sanda (JP); Kenta Osugi, Kobe (JP); Masahiro Kihara, Sanda (JP)

(73) Assignee: UENO FINE CHEMICALS INDUSTRY, LTD., Osaka (JP)

( * ) Notice: Subject to any disclaimer, the term of this patent is extended or adjusted under 35 U.S.C. 154(b) by 51 days.

(21) Appl. No.: 16/256,537

(22) Filed: Jan. 24, 2019

(65) Prior Publication Data
US 2019/0233582 A1    Aug. 1, 2019

(30) Foreign Application Priority Data

Jan. 26, 2018  (JP) ................. 2018-011345
Jan. 26, 2018  (JP) ................. 2018-011346

(51) Int. Cl.
| | |
|---|---|
| *C08K 3/22* | (2006.01) |
| *C08G 63/197* | (2006.01) |
| *C08G 63/191* | (2006.01) |
| *C08G 63/189* | (2006.01) |
| *C08G 63/40* | (2006.01) |
| *C08L 67/03* | (2006.01) |
| *C08K 7/08* | (2006.01) |

(52) U.S. Cl.
CPC ......... *C08G 63/197* (2013.01); *C08G 63/189* (2013.01); *C08G 63/191* (2013.01); *C08G 63/40* (2013.01); *C08K 3/22* (2013.01); *C08K 7/08* (2013.01); *C08L 67/03* (2013.01); *C08K 2003/2237* (2013.01); *C08K 2201/003* (2013.01); *C08K 2201/004* (2013.01); *C08L 2201/02* (2013.01); *C08L 2203/20* (2013.01)

(58) Field of Classification Search
CPC .. C08G 63/197; C08G 63/189; C08G 63/191; C08G 63/40; C08K 3/22; C08K 7/08; C08K 2003/2241; C08K 2003/2237; C08K 2201/003; C08L 67/03; C08L 2205/025; C08L 2003/20; C08L 67/00; C09K 19/3809
USPC ...................................................... 528/181
See application file for complete search history.

(56) References Cited

U.S. PATENT DOCUMENTS

| | | | | |
|---|---|---|---|---|
| 5,474,853 A | * | 12/1995 | Watanabe | ......... C08K 7/04 428/458 |
| 10,125,240 B2 | * | 11/2018 | Tsuchiya | ......... C08G 63/065 |
| 10,711,134 B2 | * | 7/2020 | Tsuchiya | ......... C08L 67/00 |
| 2009/0275678 A1 | * | 11/2009 | Kumazawa | ......... C08L 69/00 523/523 |
| 2011/0114883 A1 | | 5/2011 | Murouchi et al. | |
| 2012/0235092 A1 | | 9/2012 | Sekimura et al. | |
| 2017/0283586 A1 | * | 10/2017 | Tsuchiya | ......... C09K 19/3809 |
| 2019/0112473 A1 | * | 4/2019 | Tsuchiya | ......... C08L 67/04 |

FOREIGN PATENT DOCUMENTS

| | | |
|---|---|---|
| JP | 01-118567 A | 5/1989 |
| JP | 07-109406 A | 4/1995 |
| JP | 2000-154314 A | 6/2000 |
| JP | 2000-239503 A | 9/2000 |
| JP | 2009-242453 A | 10/2009 |
| JP | 2009-242456 A | 10/2009 |
| JP | 2012-193270 A | 10/2012 |
| JP | 2015-000949 A | 1/2015 |
| JP | 2015-021110 A | 2/2015 |
| JP | 5826411 B2 | 12/2015 |

* cited by examiner

*Primary Examiner* — Hannah J Pak
(74) *Attorney, Agent, or Firm* — Sughrue Mion, PLLC

(57) ABSTRACT

An object of the present invention is to provide a liquid crystal polyester resin composition in which satisfactory fluidity and excellent mechanical properties as well as flame retardancy are obtained, and the generation of particles is suppressed, and a molded article composed of the liquid crystal polyester resin composition. The present invention relates to a liquid crystal polyester resin composition containing: 100 parts by mass of a liquid crystal polyester (A) including repeating units represented by the formulas (I) to (III),

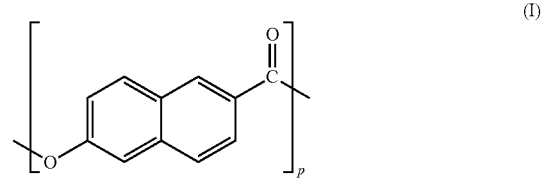

(I)

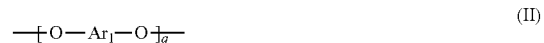

(II)

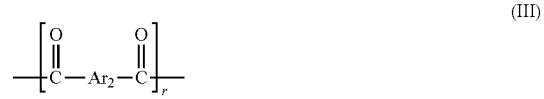

(III)

wherein $Ar_1$ and $Ar_2$ each represent one or more divalent aromatic groups, and p, q and r each represent a composition ratio (mol %) of each repeating unit in the liquid crystal polyester (A) and satisfy the following conditions, $35 \leq p \leq 90$, $5 \leq q \leq 30$, and $5 \leq r \leq 30$; and 1 to 150 parts by mass of a fibrous titanium oxide (C).

4 Claims, 1 Drawing Sheet

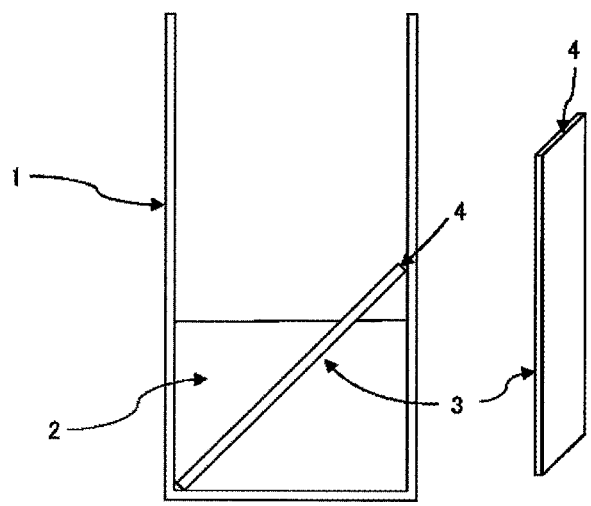

LIQUID CRYSTAL POLYESTER RESIN COMPOSITION

BACKGROUND OF THE INVENTION

1. Field of the Invention

The present invention claims the priority under the Paris Convention based on Japanese Patent Application No. 2018-11345 (filing date: Jan. 26, 2018) and Japanese Patent Application No. 2018-11346 (filing date: Jan. 26, 2018), the entirety of which is hereby incorporated herein by reference.

The present invention relates to a liquid crystal polyester resin composition in which satisfactory fluidity and excellent mechanical properties as well as excellent flame retardancy are obtained, and the generation of particles is suppressed.

2. Description of the Related Art

A liquid crystal polyester has a feature of having satisfactory fluidity and hardly generating flash and is also excellent in heat resistance and mechanical properties such as rigidity, chemical resistance, dimensional accuracy and the like, thus increasing the use thereof in electric and electronic components having complicated shapes.

Along with the rapid growth of information technology (IT), increase in integration density, downsizing, reduction in thickness and height, and the like of electric and electronic components have recently advanced in the field of information and communication. There are many cases where very thin part with a thickness of 0.5 mm or less is formed and a resin is also required to have satisfactory fluidity which enables complete filling in such a part (thin-walled part). The liquid crystal polyester is generally excellent in fluidity compared with other resins and, when reduction in wall thickness is required, more severe flame retardancy has been required together with further improvement in fluidity.

There have been proposed, as a method for improving the flame retardancy of a liquid crystal polyester, methods of adding halogen-based flame retardants (JP-A-1-118567), silicone (JP-A-2000-239503), phosphorus-based compounds (JP-A-7-109406) and red phosphorus (JP-A-2000-154314).

Although the method of adding these substances has a certain degree of a flame retardancy-improving effect, there was a possibility that the method of adding halogen-based flame retardants and phosphorus-based compounds causes corrosion of a mold due to the generation of a gas. The method of adding red phosphorus cannot be used in applications which require white color, and the method of adding phosphorus-based compounds and silicone had a problem that it may cause contamination of a mold and the generation of a gas.

Meanwhile, there has been known that a molded article of a liquid crystal polyester may cause a phenomenon in which a resin surface is peeled by ultrasonic cleaning or sliding with other members and becomes fluffy (hereinafter referred to as "fibrillation").

In the case of precision instruments, especially optical instruments equipped with a lens, very little refuse and dust affect instrument performances. In components used in optical instruments, for example, a camera module, if small refuse, oil, dust and the like are stuck on the lens, optical properties of the camera module may drastically deteriorate.

For the purpose of preventing deterioration of optical properties, components constituting the camera module, such as a lens-barrel part, a mount holder part, a frame of CMOS (image sensor), a shutter and a shutter bobbin part (hereinafter also referred to as "components for camera module") are usually subjected to ultrasonic cleaning before assembling to thereby remove small refuse, dust and the like stuck on the surface.

However, a molded article made of a liquid crystal polyester resin composition is likely to undergo peeling of a surface thereof, and when subjected to ultrasonic cleaning, fibrillation in which the surface is peeled and becomes fluffy is likely to occur. From the fibrillated part, fine powder and dust made of the resin composition (hereinafter referred to as particles) are likely to be generated. The particles thus generated had a problem that foreign substances are formed during assembling of the camera module and during use of a camera, regardless of very small size thereof, leading to drastic deterioration of optical properties of the camera module.

There have been proposed, as the liquid crystal polyester resin in which the generation of particles is suppressed, resin compositions in which specific fillers (talc, glass fiber, carbon black, etc.), olefin-based copolymers and the like are contained in a liquid crystal polyester (JP-B1-5826411, JP-A-2015-021110, JP-A-2015-000949, JP-A-2012-193270, JP-A-2009-242453 and JP-A-2009-242456).

However, the resin compositions proposed in JP-B1-5826411, JP-A-2015-021110, JP-A-2015-000949, JP-A-2012-193270, JP-A-2009-242453 and JP-A-2009-242456 were insufficient in particle generation-suppressing effect when subjected to ultrasonic cleaning because of poor wettability between an inorganic filler and a liquid crystal polyester. Therefore, there has been required to obtain a liquid crystal polyester resin composition in which the generation of particles is reduced in the case of ultrasonic cleaning.

SUMMARY OF THE INVENTION

An object of the present invention is to provide a liquid crystal polyester resin composition in which satisfactory fluidity and excellent mechanical properties as well as excellent flame retardancy are obtained, and the generation of particles is suppressed, and a molded article composed of the liquid crystal polyester resin composition.

In light of the above problems, the present inventors have intensively studied and found that, blending a liquid crystal polyester including specific repeating units with a fibrous titanium oxide, especially blending two liquid crystal polyesters including specific repeating units and blending a fibrous titanium oxide, enables the production of a liquid crystal polyester resin composition having excellent fluidity and excellent mechanical properties such as tensile strength and bending strength in which the flame retardancy is improved and the generation of particles is suppressed. Thus, the present invention has been completed.

The present invention relates to a liquid crystal polyester resin composition comprising:

100 parts by mass of a liquid crystal polyester (A) including repeating units represented by the formulas (I) to (III),

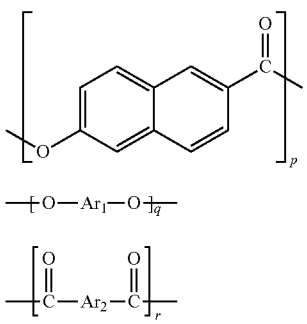

(I)

(II)

$-\!\!+\!O\!-\!Ar_1\!-\!O\!+\!\!-$ (III)

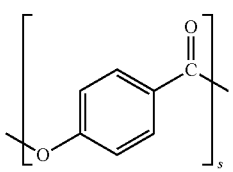

wherein $Ar_1$ and $Ar_2$ each represent one or more divalent aromatic groups, and p, q and r each represent a composition ratio (mol %) of each repeating unit in the liquid crystal polyester (A) and satisfy the following conditions, $35 \leq p \leq 90$, $5 \leq q \leq 30$, and $r \leq 30$; and 1 to 150 parts by mass of a fibrous titanium oxide (C).

In another preferred embodiment, the present invention relates to a liquid crystal polyester resin composition comprising:

a liquid crystal polyester (A) including repeating units represented by the formulas (I) to (III),

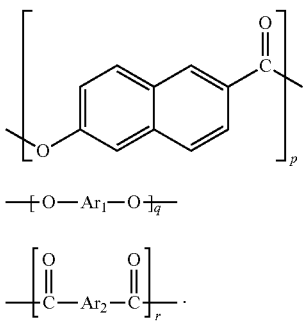

(I)

(II)

$-\!\!+\!O\!-\!Ar_1\!-\!O\!+\!\!-$ (III)

wherein $Ar_1$ and $Ar_2$ each represent one or more divalent aromatic groups, and p, q and r each represent a composition ratio (mol %) of each repeating unit in the liquid crystal polyester (A) and satisfy the following conditions, $35 \leq p \leq 90$, $5 \leq q \leq 30$, and $5 \leq r \leq 30$;

a liquid crystal polyester (B) including repeating units represented by the formulas (IV) and (V):

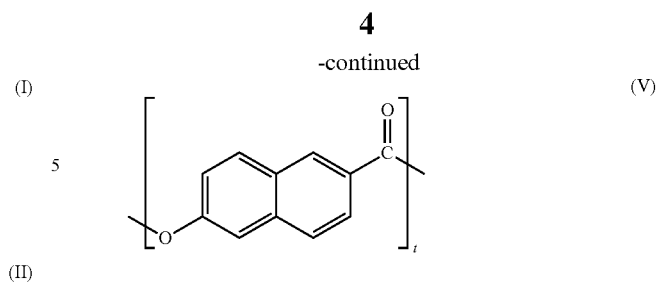

(IV)

(V)

wherein s and t each represent a composition ratio (mol %) of each repeating unit in the liquid crystal polyester (B) and satisfy the following conditions, $80/20 \leq s/t \leq 60/40$; and a fibrous titanium oxide (C)

wherein a mass ratio [A/B] of (A) to (B) is 90/10 to 45/55, and a content of (C) is 1 to 150 parts by mass based on 100 parts by mass of a total amount of (A) and (B).

The liquid crystal polyester resin composition of the present invention is excellent in fluidity and mechanical strength and therefore can be used in various applications such as electric and electronic components, various telecommunications equipment, cases and packages for electronic devices and the like. Since the flame retardancy is improved and the generation of particles is suppressed, the liquid crystal polyester resin composition is particularly suitably used in applications, for example, optical electronic components such as a camera module and device components such as a mini-breaker.

BRIEF DESCRIPTION OF THE DRAWING

FIG. 1 is a diagram schematically showing a state where a test piece is placed in a cylindrical glass container in the measurement of the number of particles generated.

DETAILED DESCRIPTION OF THE INVENTION

Both a liquid crystal polyester (A) used in the liquid crystal polyester resin composition of the present invention and a liquid crystal polyester (B) which is optionally used are liquid crystal polyesters which form an anisotropic molten phase, called thermotropic liquid crystal polyesters by a person skilled in the art.

The properties of the anisotropic molten phase of the liquid crystal polyester can be confirmed by a common polarization inspection method utilizing orthogonal polarizers. Specifically, the properties thereof can be confirmed by observing a sample placed on a hot stage in a nitrogen atmosphere.

The liquid crystal polyester (A) will be described below.

In the present invention, the liquid crystal polyester (A) includes repeating units represented by the formulas (I) to (III),

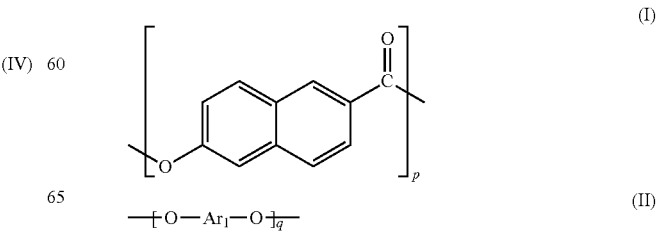

(I)

(II)

$-\!\!+\!O\!-\!Ar_1\!-\!O\!+\!\!-$

-continued

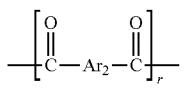 (III)

wherein Ar$_1$ and Ar$_2$ each represent one or more divalent aromatic groups, and p, q and r each represent a composition ratio (mol %) of each repeating unit in the liquid crystal polyester (A) and satisfy the following conditions,
p≤90,
5≤q≤30, and
5≤r≤30.

A composition ratio p according to the formula (I) is preferably 40 to 85 mol %, more preferably 45 to 80 mol %, and still more preferably 50 to 65 mol %.

Each of a composition ratio q according to the formula (II) and a composition ratio r according to the formula (III) is preferably 7.5 to 30 mol %, more preferably 10 to 27.5 mol %, and still more preferably 17.5 to 25 mol %. Each of q and r is preferably an equimolar amount.

In the above repeating units, for example, the fact that Ar$_1$ (or Ar$_2$) represents two or more divalent aromatic groups means that two or more repeating units represented by the formula (II) (or (III)) are included in the liquid crystal polyester according to the type of a divalent aromatic group. In this case, a composition ratio q according to the formula (II) (or a composition ratio r according to the formula (III)) represents a composition ratio in which two or more repeating units are summed up.

Specific examples of the monomer which gives the repeating unit represented by the formula (I) include 6-hydroxy-2-naphthoic acid, and ester-forming derivatives such as an acylated product, an ester derivative and an acid halide thereof.

Specific examples of the monomer which gives the repeating unit represented by the formula (II) include aromatic diols such as hydroquinone, resorcin, 2,6-dihydroxynaphthalene, 2,7-dihydroxynaphthalene, 1,6-dihydroxynaphthalene, 1,4-dihydroxynaphthalene, 4,4'-dihydroxybiphenyl, 3,3'-dihydroxybiphenyl, 3,4'-dihydroxybiphenyl and 4,4'-dihydroxybiphenyl ether, and an alkyl-, alkoxy- or halogen-substituted product thereof, as well as an ester-forming derivative such as an acylated product thereof.

Specific examples of the monomer which gives the repeating unit represented by the formula (III) include aromatic dicarboxylic acids such as terephthalic acid, isophthalic acid, 2,6-naphthalenedicarboxylic acid, 1,6-naphthalenedicarboxylic acid, 2,7-naphthalenedicarboxylic acid, 1,4-naphthalenedicarboxylic acid and 4,4'-dicarboxybiphenyl, and an alkyl-, alkoxy- or halogen-substituted product thereof, as well as ester-forming derivatives such as an ester derivative and an acid halide thereof.

Of these, a liquid crystal polyester in which Ar$_1$ and Ar$_2$ according to the repeating units represented by the formulas (II) and (III) each independently include one or more aromatic groups selected from the group consisting of aromatic groups represented by the formulas (1) to (4) is preferably used as the liquid crystal polyester (A).

 (1)

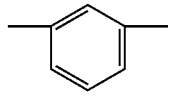 (2)

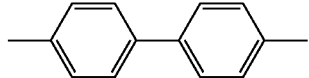 (3)

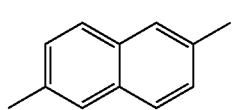 (4)

Of these, aromatic groups represented by the formulas (1) and (3) are more preferable as the repeating unit represented by the formula (II) since it is easy to adjust the reactivity during polymerization as well as mechanical properties, heat resistance, crystal melting temperature and moldability of the resulting liquid crystal polyester (A) to an appropriate level. Examples of the monomer which gives these repeating units include 4,4'-dihydroxybiphenyl and hydroquinone, and an ester-forming derivative thereof.

An aromatic group represented by the formula (1) is more preferable as the repeating unit represented by the formula (III) since it is easy to adjust mechanical properties, heat resistance, crystal melting temperature and moldability of the resulting liquid crystal polyester (A) to an appropriate level. Examples of the monomer which gives these repeating units include terephthalic acid and an ester-forming derivative thereof.

It is possible to use, as the liquid crystal polyester (A), a liquid crystal polyester in which at least two repeating units according to the formulas (1) and (3) are included in the repeating unit represented by the formula (II) and the content of the repeating unit according to the formula (1) in 100 mol % of the repeating unit represented by the formula (III) is preferably 80 to 99.9 mol %, more preferably 85 to 99 mol %, and still more preferably 90 to 98 mol %.

In the liquid crystal polyester (A) of the present invention, the total [p+q+r] of composition ratios of repeating units is preferably 100 mol %, and other repeating units may be further included as long as the objects of the present invention are not impaired.

Examples of the monomer which gives other repeating units include other aromatic hydroxycarboxylic acid, aromatic hydroxyamine, aromatic diamine, aromatic aminocarboxylic acid, aromatic hydroxydicarboxylic acid, aliphatic diol, aliphatic dicarboxylic acid, aromatic melcaptocarboxylic acid, aromatic dithiol, aromatic melcaptophenol, and a combination thereof.

Specific examples of the other aromatic hydroxycarboxylic acid include 4-hydroxybenzoic acid, 3-hydroxybenzoic acid, 2-hydroxybenzoic acid, 5-hydroxy-2-naphthoic acid, 3-hydroxy-2-naphthoic acid, 4'-hydroxyphenyl-4-benzoic acid, 3'-hydroxyphenyl-4-benzoic acid, 4'-hydroxyphenyl-3-benzoic acid, and an alkyl-, alkoxy- or halogen-substituted product thereof, as well as ester-forming derivatives such as an acylated product, an ester derivative and an acid halide thereof.

The total of composition ratios of repeating units given from these other monomer components is preferably 10 mol % or less based on the overall repeating units.

A crystal melting temperature of the liquid crystal polyester (A) used in the present invention is not particularly limited and is preferably 310 to 360° C.

In the present specification and claims, "crystal melting temperature" is determined from a crystal melting peak temperature when measured at a temperature rise rate of 20° C./min using Differential Scanning Calorimeter (hereinafter abbreviated to DSC). More specifically, after observation of a peak at an endothermic peak temperature (Tm1) when measured under temperature rise conditions of 20° C./min from room temperature using a sample of a liquid crystal polyester, the sample is maintained at a temperature which is 20 to 50° C. higher than Tm1 for 10 minutes and cooled to room temperature under temperature drop conditions of 20° C./min. When measured again under temperature rise conditions of 20° C./min, an endothermic peak is observed and a temperature which exhibits its peak top is regarded as a crystal melting temperature of a liquid crystal polyester. It is possible to use, as a measuring instrument, for example, Exstar 6000 manufactured by Seiko Instruments Inc.

The liquid crystal polyester (A) used in the present invention preferably exhibits a melt viscosity, as measured under the conditions of a shear rate of 1,000 s$^{-1}$ at a crystal melting temperature+30° C. by Capillary Rheometer (Capirograph 1D, manufactured by Toyo Seiki Seisaku-sho, Ltd.) using a capillary with a size of 0.7 mmφ×10 mm, of 1 to 1,000 Pa·s, and more preferably 5 to 300 Pa·s.

The liquid crystal polyester (B) will be described below.

In the present invention, it is possible to use, as the liquid crystal polyester (B), a liquid crystal polyester including repeating units represented by the formulas (IV) and (V),

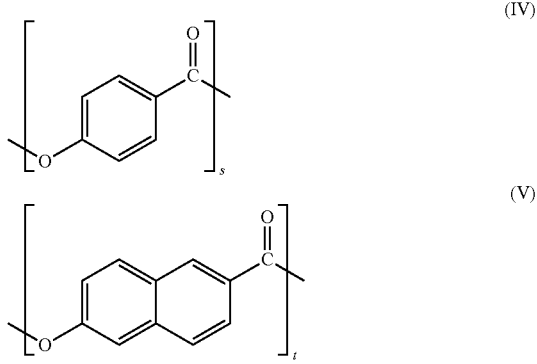

wherein s and t each represent a composition ratio (mol %) of each repeating unit in the liquid crystal polyester (B) and satisfy the following conditions,
80/20≤s/t≤60/40.

In the liquid crystal polyester (B), a molar ratio [s/t] of a repeating unit represented by the formula (IV) to a repeating unit represented by the formula (V) is 80/20 to 60/40, and preferably 75/25 to 70/30.

Specific examples of the monomer which gives the repeating unit represented by the formula (IV) according to the liquid crystal polyester (B) include 4-hydroxybenzoic acid, as well as ester-forming derivatives such as an acylated product, an ester derivative and an acid halide thereof.

Specific examples of the monomer which gives the repeating unit represented by the formula (V) according to the liquid crystal polyester (B) include 6-hydroxy-2-naphthoic acid, as well as ester-forming derivatives such as an acylated product, an ester derivative and an acid halide thereof.

In the liquid crystal polyester (B), the total [s+t] of composition ratios of repeating units is preferably 100 mol %, and other repeating units may be further contained as long as the objects of the present invention are not impaired.

Examples of the monomer which gives other repeating units constituting the liquid crystal polyester (B) include other aromatic hydroxycarboxylic acid, aromatic diol, aromatic dicarboxylic acid or aromatic hydroxydicarboxylic acid, aromatic hydroxyamine, aromatic diamine, aromatic aminocarboxylic acid, aromatic melcaptocarboxylic acid, aromatic dithiol, aromatic melcaptophenol, and a combination thereof.

Specific examples of the other aromatic hydroxycarboxylic acid include 3-hydroxybenzoic acid, 2-hydroxybenzoic acid, 5-hydroxy-2-naphthoic acid, 3-hydroxy-2-naphthoic acid, 4'-hydroxyphenyl-4-benzoic acid, 3'-hydroxyphenyl-4-benzoic acid, 4'-hydroxyphenyl-3-benzoic acid, and an alkyl-, alkoxy- or halogen-substituted product thereof, as well as ester-forming derivatives such as an acylated product, an ester derivative and an acid halide thereof.

Specific examples of the aromatic diol which is a monomer which gives other repeating units are the same as those mentioned as the monomer which gives the repeating unit of the formula (II).

Specific examples of the aromatic dicarboxylic acid which is a monomer which gives other repeating units are the same as those mentioned as the monomer which gives the repeating unit of the formula (III).

The total of composition ratios of repeating units given from these other monomer components is preferably 10 mol % or less based on the overall repeating units.

A crystal melting temperature of the liquid crystal polyester (B) used in the present invention is not particularly limited and, for example, it is preferably 250 to 300° C.

The liquid crystal polyester (B) used in the present invention preferably exhibits a melt viscosity, as measured under the conditions of a shear rate of 1,000 s$^{-1}$ at a crystal melting temperature+40° C. by Capillary Rheometer (Capirograph 1D, manufactured by Toyo Seiki Seisaku-sho, Ltd.) using a capillary with a size of 0.7 mmφ×10 mm, of 1 to 1,000 Pa, and more preferably, 5 to 300 Pa·s.

A method for producing a liquid crystal polyester (A) and a liquid crystal polyester (B) will be described below.

There is no particular limitation on a method for producing a liquid crystal polyester (A) used in the present invention and the liquid crystal polyester (B) which is optionally used in the present invention, and it is possible to use a known polycondensation method which forms an ester bond composed of a combination of the above monomers, for example, a molten acidolysis method, a slurry polymerization method or the like.

The molten acidolysis method is a method suited for production of the liquid crystal polyester used in the present invention. According to this method, first, monomers are heated to form a melt of the reactants and then the melt is continuously reacted to yield a molten polyester. The final step of this method may be carried out in vacuo to facilitate removal of volatile by-products (e.g., acetic acid, water, etc.).

The slurry polymerization method is a method of reacting in the presence of a heat exchange fluid, and a solid product is obtained in a state of being suspended in a heat exchange medium.

In either the molten acidolysis method or the slurry polymerization method, polymerizable monomer components used for production of the liquid crystal polyester can be used for the reaction in a modified form obtained by acylating hydroxyl groups at normal temperature, namely, a lower acylated product. The lower acyl group preferably has 2 to 5 carbon atoms, and more preferably 2 or 3 carbon atoms. Particularly preferred method is a method in which the acetylated product of the monomer components is used for the reaction.

The lower acylated products of the monomers may be those prepared in advance by acylating the monomers independently or may be those produced in the reaction system by adding an acylating agent such as acetic anhydride to the monomers during producing the liquid crystal polyester.

In either the molten acidolysis method or the slurry polymerization method, a catalyst may be optionally used during the reaction.

Specific examples of the catalyst include organotin compounds (dialkyltin oxide such as dibutyltin oxide, diaryltin oxide, etc.), organotitanium compounds (titanium dioxide, antimony trioxide, alkoxytitanium silicate, titanium alkoxide, etc.), alkali and alkali earth metal salts of carboxylic acid (potassium acetate, sodium acetate, etc.), Lewis acid ($BF_3$, etc.), and gaseous acid catalysts such as hydrogen chloride (HCl, etc.).

The amount of the catalyst used is preferably 10 to 1,000 ppm, and more preferably 20 to 200 ppm, based on the mass of the monomer.

The liquid crystal polyester obtained by such polycondensation reaction is drawn from a polymerization reaction vessel in a molten state and then processed into pellets, flakes or powder, followed by molding or melt-kneading.

The liquid crystal polyester in the form of pellets, flakes or powder may be subjected to a heat treatment substantially in a solid-phase state under reduced pressure, in vacuo, or in an atmosphere of an inert gas such as nitrogen or helium in order to improve the heat-resistance by increasing the molecular weight.

The liquid crystal polyester (A) thus processed into pellets, flakes or powder and optionally used liquid crystal polyester (B) are melt-kneaded with a fibrous titanium oxide (C) using a Banbury mixer, a kneader, a single or twin screw extruder or the like, thus obtaining a liquid crystal polyester resin composition of the present invention. In the embodiment in which the liquid crystal polyester (A) and the liquid crystal polyester (B) are used, a liquid crystal polyester resin composition of a liquid crystal polyester (A) containing no fibrous titanium oxide (C) and a liquid crystal polyester (B) (hereinafter also referred to as melt-blended resin) is prepared in advance and then a fibrous titanium oxide (C) is blended in the liquid crystal polyester resin composition in the same manner as mentioned above, thus making it possible to obtain a liquid crystal polyester resin composition of the present invention.

In the embodiment in which the liquid crystal polyester (A) and the liquid crystal polyester (B) are used, a mass ratio [A/B] of the liquid crystal polyester (A) to the liquid crystal polyester (B) is usually 90/10 to 45/55, and preferably 85/15 to 75/25.

If [A/B] is more than 90/10, the strength of the liquid crystal polyester resin composition may not be sufficiently improved. If [A/B] is less than 45/55, not only the heat resistance of the liquid crystal polyester resin composition may deteriorate, but also sufficient bending elastic modulus may not be obtained.

A mass ratio of the liquid crystal polyester (A) to the liquid crystal polyester (B) may be adjusted when a melt-blended resin is prepared in advance by melt-kneading, or may be adjusted when (A) and (B) are separately or simultaneously blended with the fibrous titanium oxide (C) to obtain a liquid crystal polyester resin composition.

The content of the fibrous titanium oxide (C) in the liquid crystal polyester resin composition of the present invention is 1 to 150 parts by mass, preferably 2 to 120 parts by mass, more preferably 5 to 110 parts by mass, and still more preferably 10 to 80 parts by mass, based on 100 parts by mass of the liquid crystal polyester (A), or based on 100 parts by mass of the total amount of the liquid crystal polyester (A) and the liquid crystal polyester (B) in the embodiment in which the liquid crystal polyester (A) and the liquid crystal polyester (B) are used.

If the content of the fibrous titanium oxide (C) is less than the above lower limit, it is not easy to obtain the effect of improving the strength and the flame retardancy of the liquid crystal polyester resin composition, and the particle generation-suppressing effect may become insufficient. If the content of the fibrous titanium oxide (C) is more than the above upper limit, the fluidity may become insufficient, and abrasion of a cylinder and a mold of a molding machine may increase.

Since satisfactory wettability of an interface between the liquid crystal polyester and the fibrous titanium oxide is obtained by containing the fibrous titanium oxide in the liquid crystal polyester, it is considered that the generation of particles due to ultrasonic cleaning is suppressed. Particles contain a resin, a filler and the like which came off from a molded article made of the liquid crystal polyester resin composition of the present invention.

A number average fiber length (L) of the fibrous titanium oxide in the present invention is preferably 1 µm to 50 µm, more preferably 2 µm to 40 µm, and still more preferably 3 µm to 30 µm. If the number average fiber length (L) of the fibrous titanium oxide is less than the above lower limit, the mechanical strength may not be maintained. If the number average fiber length is more than the above upper limit, the effect of suppressing the generation of particles may become insufficient.

A number average fiber diameter (D) of the fibrous titanium oxide is preferably 0.05 µm to 2.0 µm, more preferably 0.1 µm to 1.5 µm, and still more preferably 0.1 µm to 1.0 µm. If the number average fiber diameter (D) of the fibrous titanium oxide is less than the above lower limit, the mechanical strength may not be maintained. If the number average fiber diameter is more than the above upper limit, the effect of suppressing the generation of particles may become insufficient.

In order to realize the rigidity and suppression of the generation of particles with good balance, L/D of the number average fiber length (L) to the number average fiber diameter (D) is preferably 3 to 50, more preferably 3.5 to 40, and still more preferably 4 to 30. If L/D is less than the above lower limit, the mechanical strength may not be maintained. If L/D is more than the above upper limit, the effect of suppressing the generation of particles may become insufficient.

A method of measuring the number average fiber length (L) and the number average fiber diameter (D) is as follows. Using a scanning electron microscope (S2100A, manufactured by Hitachi, Ltd.), observation was performed and micrographs were taken at a magnification of 10,000 times. After sampling 500 fibers at random, the number average value of a length of the longest part of each fiber (particle) was regarded as the number average fiber length, and the number average value of a length of the shortest part of each fiber was regarded as the number average fiber diameter.

A crystal structure of the fibrous titanium oxide used in the present invention is not particularly limited and one or more crystal structures selected from the group consisting of rutile type, anatase type and brucite type crystal structures can be used. In view of excellent particle generation-reducing effect when subjected to ultrasonic cleaning, a rutile type crystal structure is preferable. In order to improve dispersion in the resin, the crystal structure may be doped with other oxides of metals such as magnesium and calcium.

Examples of the fibrous titanium oxide used in the present invention include needle-like titanium oxide and rod-like titanium oxide.

It is also possible to use the fibrous titanium oxide used in the present invention after treating a surface thereof with known coupling agents (e.g., silane-based coupling agents, titanate-based coupling agents, aluminum-based coupling agents, etc.) and other surface treatment agents.

The liquid crystal polyester resin composition of the present invention may contain, in addition to the above-mentioned needle-like titanium oxide (C), for example, other fibrous, plate-like, granular inorganic filler or organic fillers as long as the effects of the present invention are not impaired. Preferably, the liquid crystal polyester resin composition of the present invention includes only the fibrous titanium oxide (C) as the filler.

When the liquid crystal polyester resin composition of the present invention contains an inorganic filler or an organic filler other than the fibrous titanium oxide (C), the content is preferably 0.1 to 30 parts by mass, and more preferably 0.5 to 20 parts by mass, based on 100 parts by mass of the liquid crystal polyester (A), or based on 100 parts by mass of the total amount of the liquid crystal polyester (A) and the liquid crystal polyester (B) in the embodiment in which the liquid crystal polyester (A) and the liquid crystal polyester (B) are used. If the content of these other additives is more than the above upper limit, the moldability may deteriorate and the thermal stability may become inferior.

Examples of the other fibrous filler include milled glass, silica alumina fiber, alumina fiber, carbon fiber, aramid fiber, polyallylate fiber, polybenzimidazole fiber, potassium titanate whisker, aluminum borate whisker, wollastonite and the like, and these other fibrous fillers may be used alone or in combination of two or more thereof.

Examples of the other plate-like filler include silicates such as talc, mica, kaolin, clay, vermiculite, calcium silicate, aluminum silicate, feldspar powder, acid clay, pyrophyllite clay, sericite, sillimanite, bentonite, glass flake, slate powder and silane; carbonates such as calcium carbonate, chalk, barium carbonate, magnesium carbonate and dolomite; sulfates such as baryta powder, precipitated calcium sulfate, calcined gypsum and barium sulfate; hydroxides such as hydrated alumina; oxides such as alumina, antimony oxide, magnesia, plate-like titanium oxide, zinc oxide, silica, silica sand, quartz, white carbon and diatomaceous earth; sulfates such as molybdenum disulfide; and plate-like wollastonite. These other plate-like fillers may be used alone or in combination of two or more thereof.

Examples of the other granular filler include calcium carbonate, glass beads, barium sulfate, granular titanium oxide and the like. These other granular fillers may be used alone or in combination of two or more thereof.

The liquid crystal polyester resin composition of the present invention can contain other additives as long as the effects of the present invention are not impaired.

Examples of other additives include lubricants such as higher fatty acid, higher fatty acid ester, higher fatty acid amide and higher fatty acid metal salt (higher fatty acid means fatty acid having 10 to 25 carbon atoms); release modifiers such as polysiloxane and fluororesin; colorants such as dyes, pigments and carbon black; flame retardants; antistatic agents; surfactants; antioxidants such as phosphorus-based antioxidants, phenol-based antioxidants and sulfur-based antioxidant; weathering agents; heat stabilizers; neutralizers; and the like. These additives may be used alone or in combination of two or more thereof.

The content of other additives is preferably 0.1 to 10 parts by mass, and more preferably 0.5 to 5 parts by mass, based on 100 parts by mass of the liquid crystal polyester (A), or based on 100 parts by mass of the total amount of the liquid crystal polyester (A) and the liquid crystal polyester (B) in the embodiment in which the liquid crystal polyester (A) and the liquid crystal polyester (B) are used. If the content of these other additives is more than the above upper limit, the moldability may deteriorate and the thermal stability may become inferior.

Additives having external lubricant effect, such as higher fatty acid, higher fatty acid ester, higher fatty acid metal salt and fluorocarbon-based surfactants may be adhered in advance to a surface of pellets of the liquid crystal polyester resin composition when the liquid crystal polyester resin composition is molded.

The liquid crystal polyester resin composition of the present invention may further contain other resin components as long as the objects of the present invention are not impaired. Examples of other resin components include thermoplastic resins such as polyamide, polyester, polyacetal, polyphenylene ether and modified polyphenylene ether, polysulfone, polyethersulfone, polyetherimide and polyamideimide; and thermosetting resins such as a phenol resin, an epoxy resin and a polyimide resin.

Other resin components may be contained alone or in combination of two or more thereof. The content of other resin components is not particularly limited and may be appropriately determined according to applications and purposes of the liquid crystal polyester resin composition. Typically, other resin components are added in the amount of preferably 0.1 to 100 parts by mass, and more preferably 0.1 to 80 parts by mass, based on 100 parts by mass of the liquid crystal polyester (A), or based on 100 parts by mass of the total amount of the liquid crystal polyester (A) and the liquid crystal polyester (B) in the embodiment in which the liquid crystal polyester (A) and the liquid crystal polyester (B) are used.

A liquid crystal polyester (A), an optional liquid crystal polyester (B) and a fibrous titanium oxide (C) and, optionally, other inorganic fillers and/or organic fillers, other additives, other resin components and the like are blended with a predetermined composition, and then melt-kneaded using a Banbury mixer, a kneader, a single or twin screw extruder or the like, thus making it possible to obtain a liquid crystal polyester resin composition of the present invention.

Blending of these fibrous titanium oxide (C), other fillers, other additives, other resin components and the like may be performed to either or both of the liquid crystal polyester (A) and the liquid crystal polyester (B), or a melt-blended resin composed of (A) and (B).

The thus obtained liquid crystal polyester resin composition of the present invention is molded or processed by a known molding method using an injection molding machine, an extruder or the like, thus making it possible to obtain a desired molded article.

A deflection temperature under load (ASTM D648, load of 1.82 MPa) as measured by using strip-shaped test piece (127 mm in length, 12.7 mm in width, 3.2 mm in thickness) of the liquid crystal polyester resin composition of the present invention is preferably 270° C. or higher, more preferably 275° C. or higher, still more preferably 280° C. or higher, and usually 320° C. or lower.

In the embodiment in which the liquid crystal polyester (A) and the liquid crystal polyester (B) are used, a deflection temperature under load (ASTM D648, load of 1.82 MPa) as measured by using a strip-shaped test piece (127 mm in length, 12.7 mm in width, 3.2 mm in thickness) of the liquid crystal polyester resin composition of the present invention is preferably 240° C. or higher, more preferably 245° C. or higher, still more preferably 250° C. or higher, and usually 300° C. or lower.

In a bending test using a strip-shaped test piece (127 mm in length, 12.7 mm in width, 0.5 mm in thickness), the liquid crystal polyester resin composition of the present invention preferably exhibits a bending strength of 195 MPa or more, more preferably 200 MPa or more, still more preferably 205 MPa or more, and preferably exhibits a bending elastic modulus of 11 GPa or more, and more preferably 12 GPa or more. The upper limit of the above bending strength is not particularly limited and is, for example, 400 MPa. The upper limit of the above bending elastic modulus is not particularly limited and is, for example, 30 GPa. Therefore, the above bending strength of the liquid crystal polyester resin composition of the present invention is, for example, 195 to 400 MPa, 200 to 400 MPa and 205 MPa to 400 MPa, and the above bending elastic modulus is, for example, 11 to 30 GPa and 12 to 30 GPa.

In the embodiment in which the liquid crystal polyester (A) and the liquid crystal polyester (B) are used, in a bending test using a strip-shaped test piece (127 mm in length, 12.7 mm in width, 0.5 mm in thickness), the liquid crystal polyester resin composition of the present invention preferably exhibits a bending strength of 190 MPa or more, more preferably 195 MPa or more, and still more preferably 200 MPa or more, and preferably exhibits a bending elastic modulus of 10 GPa or more, and more preferably 11 GPa or more. The upper limit of the above bending strength is not particularly limited and is, for example, 400 MPa. The upper limit of the above bending elastic modulus is not particularly limited and is, for example, 30 GPa. Therefore, the above bending strength of the liquid crystal polyester resin composition of the present invention is, for example, 190 to 400 MPa, 195 to 400 MPa and 200 MPa to 400 MPa, and the above bending elastic modulus is, for example, 10 to 30 GPa and 11 to 30 GPa.

The liquid crystal polyester resin composition of the present invention has excellent flame retardancy. In the present specification, the flame retardancy is evaluated in conformity with UL-94 standard after molding a barflow-shaped test piece with a size of 170.0 mm×12.5 mm×0.8 mm and being left to stand under the conditions of 23° C. and a relative humidity of 50% for 48 hours. The liquid crystal polyester resin composition of the present invention is characterized by being corresponding to V-0 according to the above evaluation.

Usually, the molded article made of the liquid crystal polyester composition is likely to undergo peeling of a surface thereof, and when subjected to ultrasonic cleaning, fibrillation in which the surface is peeled and becomes fluffy is likely to occur. From the fibrillated part, fine powder and dust made of the resin composition (hereinafter referred to as particles) are likely to be generated. According to the liquid crystal polyester resin composition of the present invention, since the generation of particles is suppressed, it is possible to obtain satisfactory optical properties without forming foreign substances during assembling of an optical member such as a camera module and during use of the molded article.

It is possible to evaluate the number of particles generated in the liquid crystal polyester resin composition of the present invention as the number of particles formed when the molded article is subjected to ultrasonic cleaning. The number of particles generated is preferably 1,000 or less, more preferably 800 or less, still more preferably 500 or less, and particularly preferably 300 or less. If the number of particles generated is more than the above upper limit, optical properties of electronic components may become insufficient. Details of a method of evaluating the number of particles generated are as mentioned in examples.

The liquid crystal polyester resin composition of the present invention is suitably used in electronic components such as connector, switch, relay, capacitor, coil, transformer, camera module, antenna, chip antenna and mini-breaker because of obtaining satisfactory fluidity and mechanical strength. Since the flame retardancy is improved and the generation of particles is suppressed, the liquid crystal polyester resin composition of the present invention is particularly suitably used in applications, for example, optical electronic components such as a camera module and device components such as a mini-breaker.

EXAMPLES

The present invention will be described by way of example, but the present invention is in no way limited to the following examples. The measurement and evaluation of the crystal melting temperature, the melt viscosity, the deflection temperature under load, the bending strength, the bending elastic modulus, the flame retardancy and the number of particles generated in examples were performed by the methods mentioned below.

<Crystal Melting Temperature>

After observation of an endothermic peak temperature (Tm1) of a sample when measured under temperature rise conditions of 20° C./min from room temperature using Exstar 6000 manufactured by Seiko Instruments Inc. as a differential scanning calorimeter, the sample was maintained at a temperature which is 50° C. higher than Tm1 for 10 minutes and cooled to room temperature under temperature drop conditions of 20° C./min. When measured again under temperature rise conditions of 20° C./min, an endothermic peak was observed and a temperature which exhibits its peak top was regarded as a crystal melting temperature (Tm).

<Melt Viscosity>

A melt viscosity was measured under the conditions of a shear rate of 1,000 $s^{-1}$ at a crystal melting temperature (Tm)+20° C. by Capillary Rheometer (Capirograph 1D, manufactured by Toyo Seiki Seisaku-sho, Ltd.) using a capillary with a size of 1.0 mmφ×10 mm.

<Deflection Temperature Under Load>

Using an injection molding machine (UH1000-110, manufactured by NISSEI PLASTIC INDUSTRIAL CO., LTD.), a strip-shaped test piece (127 mm in length×12.7 mm in width×3.2 mm in thickness) was molded. Using the strip-shaped test piece, a temperature at which a predetermined deflection amount (0.254 mm) is exhibited under load of 1.82 MPa at a temperature rise rate of 2° C./min was measured in conformity with ASTM D648.

<Bending Strength, Bending Elastic Modulus>

Using the same test piece as that used in the measurement of the deflection temperature under load, the measurement was performed in conformity with ASTM D790.

<Flame Retardancy>

Using an injection molding machine (PS40, manufactured by NISSEI PLASTIC INDUSTRIAL CO., LTD.), pellets of a resin composition were molded into a barflow-shaped test piece with a size of 170 mm in length, 12.7 mm in width and 0.8 mm in thickness and was left to stand under the conditions of 23° C. and a relative humidity of 50% for 48 hours, and then evaluation was performed in conformity with UL-94 standard.

<Number of Particles Generated>

Using an injection molding machine with a clamping pressure of 15 t (MINIMAT M26/15, manufactured by Sumitomo Heavy Industries, Ltd.), pellets of a resin composition were molded at a cylinder temperature which is 20° C. higher than a crystal melting temperature (Tm) and a mold temperature of 70° C. to fabricate a strip-shaped bending test piece with a size of 64 mm in length, 12.7 mm in width and 2 mm in thickness which was used as a test piece for measurement of the number of particles.

In a cylindrical glass container with a size of 50 mm in outer diameter, 45 mm in inner diameter and 100 mm in height, which is filled with 50 mL of pure water, each test piece was placed such that a gate part is not immersed in water, as shown in FIG. 1, and then the cylindrical glass container was placed in an ultrasonic cleaning tank with a size of 140 mm in length, 240 mm in width and 100 m in depth, which is filled with 1,000 mL of water.

After ultrasonic cleaning at 38 kHz and an output of 100 W for 10 minutes, the number of fallen matters (particles) with a maximum diameter of 2 μm or more included in 1 mL of pure water was measured three times using a particle counter (LiQuilaz-05, manufactured by Spectris Co., Ltd.) and an average value was regarded as the measurement result.

In examples and comparative examples, the following abbreviations represent the following compounds.

POB: Parahydroxybenzoic acid
BON6: 6-Hydroxy-2-naphthoic acid
BP: 4,4'-Dihydroxybiphenyl
HQ: Hydroquinone
TPA: Terephthalic acid
NDA: 2,6-Naphthalenedicarboxylic acid Synthesis Example 1 (LCP-1)

In a reaction vessel equipped with a stirrer with a torque meter and a distilling tube, BON6: 660.5 g (54.0 mol %), BP: 254.2 g (21.0 mol %), HQ: 14.3 g (2.0 mol %) and TPA: 248.3 g (23.0 mol %) were charged and a 1.03-fold amount by mol of acetic anhydride relative to the amount of the hydroxyl groups (mol) of the overall monomers was additionally charged, and then deacetylation polymerization was performed under the following conditions.

In a nitrogen gas atmosphere, the temperature was raised from room temperature to 150° C. over 1 hour and then maintained at 150° C. for 60 minutes. While distilling the by-produced acetic acid, the temperature was raised to 350° C. over 7 hours and the pressure was reduced to 10 mmHg over 90 minutes. The polymerization reaction was terminated at the time point at which a predetermined torque was indicated, and the contents were taken out from the reaction vessel to obtain pellets of the liquid crystal polyester using a crusher. The amount of the distilled acetic acid during the polymerization presented a substantially theoretical value. The thus obtained pellets exhibited a crystal melting temperature (Tm) of 338° C. and a melt viscosity of 23 Pa·s.

Synthesis Example 2 (LCP-2)

In a reaction vessel equipped with a stirrer with a torque meter and a distilling tube, POB: 655.4 g (73 mol %) and BON6: 330.2 g (27 mol %) were charged and a 1.02-fold amount by mol of acetic anhydride relative to the amount of the hydroxyl groups (mol) of the overall monomers was additionally charged, and then deacetylation polymerization was performed under the following conditions.

In a nitrogen gas atmosphere, the temperature was raised from room temperature to 145° C. over 1 hour and then maintained at 145° C. for 30 minutes. While distilling the by-produced acetic acid, the temperature was raised to 320° C. over 7 hours and the pressure was reduced to 10 mmHg over 80 minutes. The polymerization reaction was terminated at the time point at which a predetermined torque was indicated, and the contents were taken out from the reaction vessel to obtain pellets of the liquid crystal polyester using a crusher. The amount of the distilled acetic acid during the polymerization showed a substantially theoretical value. The thus obtained pellets exhibited a crystal melting temperature (Tm) of 279° C. and a melt viscosity of 21 Pa·s.

Synthesis Example 3 (LCP-3)

In a reaction vessel equipped with a stirrer with a torque meter and a distilling tube, POB: 641.9 g (71.5 mol %), BON6: 30.6 g (2.5 mol %), HQ: 93.0 g (13 mol %) and NDA: 182.7 g (13 mol %) were charged and a 1.03-fold amount by mol of acetic anhydride relative to the amount of the hydroxyl groups (mol) of the overall monomers was additionally charged, and then deacetylation polymerization was performed under the following conditions.

In a nitrogen gas atmosphere, the temperature was raised from room temperature to 145° C. over 1 hour and then maintained at 145° C. for 30 minutes. While distilling the by-produced acetic acid, the temperature was raised to 345° C. over 7 hours and the pressure was reduced to 10 mmHg over 80 minutes. The polymerization reaction was terminated at the time point at which a predetermined torque was indicated, and the contents were taken out from the reaction vessel to obtain pellets of the liquid crystal polyester using a crusher. The amount of the distilled acetic acid during the polymerization showed a substantially theoretical value. The thus obtained pellets exhibited a crystal melting temperature (Tm) of 321° C. and a melt viscosity of 23 Pa·s.

Fillers used in the following examples and comparative examples are shown below.

Fibrous titanium oxide (A-1): manufactured by ISHIHARA SANGYO KAISHA, LTD., needle-like titanium oxide "FTL-400" (number average fiber length (L)=10.1 μm, number average fiber diameter (D)=0.5 μm, L/D=20)

Fibrous titanium oxide (A-2): manufactured by ISHIHARA SANGYO KAISHA, LTD., rod-like titanium oxide "PFR404" (number average fiber length (L)=2.91 μm, number average fiber diameter (D)=0.4 μm, L/D=7)

Glass fiber: manufactured by CPIC, ECS3010A (number average fiber diameter of 10.5 μm)

Talc: manufactured by FUJI TALC INDUSTRIAL CO., LTD., "DS-34" (number average particle diameter of 23 μm)

Example 1

100 Parts by mass of LCP-1 and 5.4 parts by mass of a fibrous titanium oxide (A-1) were blended and then melt-kneaded at 350° C. using a twin screw extruder (TEX-30, manufactured by The Japan Steel Works, Ltd.) to obtain pellets of a liquid crystal polyester resin composition. The melt viscosity, the deflection temperature under load, the bending strength, the bending elastic modulus, the flame retardancy and the number of particles generated were measured and evaluated by the above methods. The results are shown in Table 1.

Examples 2 to 5, Comparative Examples 1 to 5

LCP-1, LCP-3, fibrous titanium oxides (A-1, A-2), a glass fiber and talc were blended in each amount shown in Table 1 and then pellets were obtained in the same manner as in Example 1, and the measurement and evaluation were performed by the above methods. The results are shown in Table 1.

As shown in Table 1, all the liquid crystal polyester resin compositions of the present invention (Examples 1 to 5) exhibited all of high deflection temperature under load, high bending strength and high bending elastic modulus, and also exhibited satisfactory evaluation results of the flame retardancy and the number of particles generated.

Meanwhile, if technical features of the present invention are not satisfied as in Comparative Examples 1 to 5, they were insufficient in bending strength, bending elastic modulus or balance therebetween, and also exhibited unpreferable evaluation results of the flame retardancy and the number of particles generated.

Example 6

70 Parts by mass of LCP-1 which is the liquid crystal polyester (A), 30 parts by mass of LCP-2 which is the liquid crystal polyester (B) and 5.4 parts by mass of the fibrous titanium oxide (A-1) were blended and then melt-kneaded at 350° C. using a twin screw extruder (TEX-30, manufactured by The Japan Steel Works, Ltd.) to obtain pellets of a liquid crystal polyester resin composition. The melt viscosity, the deflection temperature under load, the bending strength, the bending elastic modulus, the flame retardancy and the number of particles generated were measured and evaluated by the above methods. The results are shown in Table 2.

Examples 7 to 10, Comparative Examples 6 to 12

LCP-1 to LCP-3, fibrous titanium oxides (A-1, A-2), a glass fiber and talc were blended in each amount shown in Table 1 and then pellets were obtained in the same manner as in Example 6, and the measurement and evaluation were performed by the above methods. The results are shown in Table 2.

As shown in Table 2, all the liquid crystal polyester resin compositions of the present invention (Examples 6 to 10) exhibited all of high deflection temperature under load, high bending strength and high bending elastic modulus, and also exhibited satisfactory evaluation results of the flame retardancy and the number of particles generated.

Meanwhile, if technical features of the present invention are not satisfied as in Comparative Examples 6 to 12, they were insufficient in bending strength, bending elastic modulus or balance therebetween, and also exhibited unpreferable evaluation results of the flame retardancy and the number of particles generated.

TABLE 1

| | | Example | | | | | Comparative Example | | | | |
|---|---|---|---|---|---|---|---|---|---|---|---|
| | | 1 | 2 | 3 | 4 | 5 | 1 | 2 | 3 | 4 | 5 |
| LCP (parts by mass) | LCP-1 | 100 | 100 | 100 | 100 | 100 | 100 | 100 | | 100 | 100 |
| | LCP-3 | | | | | | | | 100 | | |
| Filler (parts by mass) | Fibrous titanium oxide (A-1) | 5.4 | 11.5 | 44.8 | | 106.4 | 0.52 | 170 | 44.8 | | |
| | Fibrous titanium oxide (A-2) | | | | 44.8 | | | | | | |
| | Glass fiber | | | | | | | | | 44.8 | 22.3 |
| | Talc | | | | | | | | | | 37.3 |
| Physical properties | Melt viscosity (Pa · s) | 27 | 30 | 36 | 33 | 40 | 26 | 52 | 35 | 30 | 40 |
| | Deflection temperature under load (° C.) | 287 | 290 | 292 | 287 | 280 | 280 | 275 | 250 | 305 | 289 |
| | Bending strength (MPa) | 210 | 221 | 231 | 218 | 210 | 190 | 182 | 230 | 230 | 192 |
| | Bending elastic modulus (GPa) | 14 | 13 | 14 | 13 | 13 | 10 | 9 | 14 | 16 | 13 |
| | Flame retardancy (UL-94) | V-0 | V-0 | V-0 | V-0 | V-0 | V-0 | V-0 | V-2 | V-0 | V-0 |
| | Number of particles generated | 212 | 189 | 153 | 108 | 209 | 1103 | 1218 | 101 | 2138 | 2238 |

TABLE 2

|  |  | Example |  |  |  |  | Comparative Example |  |  |  |  |  |  |
|---|---|---|---|---|---|---|---|---|---|---|---|---|---|
|  |  | 6 | 7 | 8 | 9 | 10 | 6 | 7 | 8 | 9 | 10 | 11 | 12 |
| LCP (parts by mass) | LCP-1 | 70 | 85 | 70 | 70 | 50 | 30 | 70 | 70 | 70 |  | 70 |  |
|  | LCP-2 | 30 | 15 | 30 | 30 | 50 | 70 | 30 | 30 | 30 | 30 | 30 |  |
|  | LCP-3 |  |  |  |  |  |  |  |  |  | 70 |  | 100 |
| Filler (parts by mass) | Fibrous titanium oxide (A-1) | 5.4 | 11.5 | 44.8 |  | 106.4 | 44.8 | 0.52 | 170 |  | 44.8 |  | 44.8 |
|  | Fibrous titanium oxide (A-2) |  |  |  | 44.8 |  |  |  |  |  |  |  |  |
|  | Glass fiber |  |  |  |  |  |  |  |  | 44.8 |  | 22.3 |  |
|  | Talc |  |  |  |  |  |  |  |  |  |  | 37.3 |  |
| Physical properties | Melt viscosity (Pa · s) | 32 | 33 | 35 | 32 | 29 | 25 | 24 | 50 | 32 | 25 | 30 | 35 |
|  | Deflection temperature under load (° C.) | 260 | 255 | 254 | 254 | 252 | 210 | 277 | 240 | 286 | 235 | 234 | 250 |
|  | Bending strength (MPa) | 230 | 232 | 244 | 200 | 205 | 230 | 185 | 180 | 237 | 201 | 189 | 230 |
|  | Bending elastic modulus (GPa) | 15 | 15 | 15 | 13 | 11 | 13 | 10 | 9 | 17 | 14 | 13 | 14 |
|  | Flame retardancy (UL-94) | V-0 | V-0 | V-0 | V-0 | V-0 | V-0 | V-0 | V-0 | V-0 | V-2 | V-0 | V-2 |
|  | Number of particles generated | 260 | 201 | 180 | 161 | 207 | 185 | 1038 | 1203 | 2154 | 158 | 2385 | 101 |

1: cylindrical glass container
2: pure water
3: test piece
4: gate part

What is claimed is:

1. A liquid crystal polyester resin composition comprising:

100 parts by mass of a liquid crystal polyester (A) consisting of repeating units represented by the formulas (I) to (III),

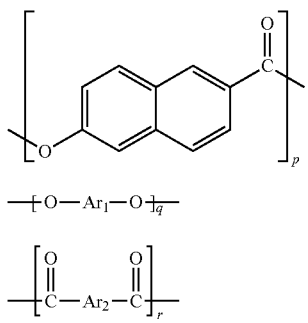

wherein $Ar_1$ and $Ar_2$ each represent one or more divalent aromatic groups, and p, q and r each represent a composition ratio (mol %) of each repeating unit in the liquid crystal polyester (A) and satisfy the following conditions,
$35 \leq p \leq 90$,
$5 \leq q \leq 30$, and
$5 \leq r \leq 30$; and
1 to 150 parts by mass of a fibrous titanium oxide (C) based on 100 parts by mass of the liquid crystal polyester (A), wherein the fibrous titanium oxide (C) has a number average fiber length (L) of 1 μm to 50 μm, a number average fiber diameter (D) of 0.05 μm to 2.0 μm, and L/D of 3 to 50.

2. The liquid crystal polyester resin composition according to claim 1, the liquid crystal polyester resin composition comprising:

a liquid crystal polyester (A) consisting of repeating units represented by the formulas (I) to (III),

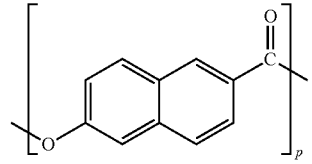

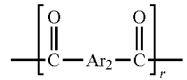

wherein $Ar_1$ and $Ar_2$ each represent one or more divalent aromatic groups, and p, q and r each represent a composition ratio (mol %) of each repeating unit in the liquid crystal polyester (A) and satisfy the following conditions,
$35 \leq p \leq 90$,
$5 \leq q \leq 30$, and
$5 \leq r \leq 30$;

a liquid crystal polyester (B) including repeating units represented by the formulas (IV) and (V),

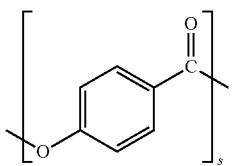

wherein s and t each represent a composition ratio (mol %) of each repeating unit in the liquid crystal polyester (B) and satisfy the following conditions, 80/20≤s/t≤60/40; and a fibrous titanium oxide (C), wherein the fibrous titanium oxide (C) has a number average fiber length (L) of 1 to 50 m, a number average fiber diameter (D) of 0.05 μm to 2.0 m, and L/D of 3 to 50, wherein a mass ratio [A/B] of (A) to (B) is 90/10 to 45/55, and a content of (C) is 1 to 150 parts by mass based on 100 parts by mass of a total amount of (A) and (B).

3. A molded article comprising the liquid crystal polyester resin composition according to claim 1.

4. The molded article according to claim 3, wherein the molded article is a component constituting one selected from the group consisting of connector, switch, relay, capacitor, coil, transformer, camera module, antenna, chip antenna and mini-breaker.

* * * * *